(12) United States Patent
Atkinson et al.

(10) Patent No.: US 12,070,636 B2
(45) Date of Patent: Aug. 27, 2024

(54) HAZARDOUS PRODUCTS CONTAINMENT SYSTEM AND METHOD

(71) Applicant: E-CELL SECURE, L.L.C., Detroit, MI (US)

(72) Inventors: Dennis Atkinson, Ferndale, MI (US); Ronald Butler, West Bloomfield, MI (US)

(73) Assignee: E-Cell Secure, L.L.C., Detroit, MI (US)

( * ) Notice: Subject to any disclaimer, the term of this patent is extended or adjusted under 35 U.S.C. 154(b) by 49 days.

(21) Appl. No.: 16/682,709

(22) Filed: Nov. 13, 2019

(65) Prior Publication Data

US 2020/0147426 A1    May 14, 2020

Related U.S. Application Data

(60) Provisional application No. 62/760,573, filed on Nov. 13, 2018.

(51) Int. Cl.

| | |
|---|---|
| *A62C 2/06* | (2006.01) |
| *A62C 3/16* | (2006.01) |
| *A62C 35/10* | (2006.01) |
| *A62C 37/08* | (2006.01) |
| *A62C 37/36* | (2006.01) |
| *A62C 37/44* | (2006.01) |

(Continued)

(52) U.S. Cl.
CPC ............... *A62C 2/065* (2013.01); *A62C 3/16* (2013.01); *A62C 35/10* (2013.01); *A62C 37/04* (2013.01); *A62C 37/08* (2013.01); *A62C 37/44* (2013.01); *G08B 7/06* (2013.01); *G08B 21/182* (2013.01); *H02J 7/0042* (2013.01); *A62C 3/002* (2013.01); *A62C 3/14* (2013.01)

(58) Field of Classification Search
CPC ........... A62C 2/065; A62C 3/002; A62C 3/06; A62C 3/065; A62C 3/14; A62C 3/16; A62C 35/023; A62C 35/026; A62C 35/10; A62C 35/11; A62C 35/13; A62C 37/04; A62C 37/08; A62C 37/11; A62C 37/14; A62C 37/44
USPC ..................................................... 169/49, 50
See application file for complete search history.

(56) References Cited

U.S. PATENT DOCUMENTS

| | | | | |
|---|---|---|---|---|
| 5,016,715 A | * | 5/1991 | Alasio ................... | A62C 35/11 169/26 |
| 5,056,603 A | | 10/1991 | Parkinson | |

(Continued)

*Primary Examiner* — Cody J Lieuwen
(74) *Attorney, Agent, or Firm* — Bodman PLC

(57) ABSTRACT

A containment system for a hazardous product includes a housing unit for storing the hazardous product. The housing unit includes sensors disposed throughout for detecting a thermal event. The system further includes an active fire suppression system configured to suppress the thermal event based on thermal event information received from the sensors. The system also includes a controller for processing signals from the sensors and activating the active fire suppression system, such as providing fire suppressants locally and/or globally or active venting. The system further includes a passive fire suppression system configured to suppress the thermal event using passive suppression without requiring activation from the controller, such as by coating surfaces of the system or using temperature sensitive venting or suppressant provision. The system may further include a training system to mimic the thermal event.

23 Claims, 12 Drawing Sheets

(51) Int. Cl.
*G08B 7/06* (2006.01)
*G08B 21/18* (2006.01)
*H02J 7/00* (2006.01)
*A62C 3/00* (2006.01)

(56) References Cited

U.S. PATENT DOCUMENTS

| | | |
|---|---|---|
| 5,651,821 A | 7/1997 | Uchida |
| 5,990,789 A * | 11/1999 | Berman ............... A62C 3/00 |
| | | 109/1 R |
| 6,660,972 B1 | 12/2003 | Georgii |
| 6,981,555 B2 | 1/2006 | Smith et al. |
| 7,820,319 B2 | 10/2010 | Mehta et al. |
| 8,733,465 B1 | 5/2014 | Flood et al. |
| 8,863,856 B2 | 10/2014 | Eckholm et al. |
| 9,180,324 B2 | 11/2015 | Burkett |
| 9,233,264 B2 | 1/2016 | Graham et al. |
| 9,248,917 B2 | 2/2016 | Gastonides et al. |
| 9,345,916 B1 | 5/2016 | Kirkbride |
| 9,415,248 B2 | 8/2016 | Donahue |
| 9,539,448 B2 | 1/2017 | Jung et al. |
| 9,586,067 B1 | 3/2017 | Kirkbride |
| 11,380,943 B2 | 7/2022 | Wedig et al. |
| 2005/0057344 A1 | 3/2005 | Davis |
| 2005/0103391 A1 | 5/2005 | Harvey |
| 2006/0113302 A1 | 6/2006 | Mandava et al. |
| 2009/0014188 A1 | 1/2009 | Hesch et al. |
| 2010/0075213 A1 | 3/2010 | Mehta et al. |
| 2010/0086844 A1 | 4/2010 | Mehta et al. |
| 2010/0273034 A1 | 10/2010 | Hermann et al. |
| 2011/0234058 A1* | 9/2011 | Lee ........................ G21F 7/00 |
| | | 312/31.1 |
| 2012/0039694 A1 | 2/2012 | Suzanne |
| 2012/0308859 A1 | 12/2012 | Hermann et al. |
| 2012/0318921 A1* | 12/2012 | Rohrbach .......... A62C 99/0018 |
| | | 169/56 |
| 2013/0087570 A1 | 4/2013 | Ekhtiar et al. |
| 2013/0316198 A1* | 11/2013 | Bandhauer ............ G08C 17/02 |
| | | 429/50 |
| 2014/0186668 A1* | 7/2014 | Jung ................ H01M 10/4207 |
| | | 429/61 |
| 2014/0209331 A1 | 7/2014 | Burkett |
| 2015/0017491 A1* | 1/2015 | Specht ............... H01M 10/486 |
| | | 429/61 |
| 2015/0147602 A1 | 5/2015 | Bianchi et al. |
| 2015/0203734 A1 | 7/2015 | Kanae et al. |
| 2016/0059056 A1 | 3/2016 | Hoffman |
| 2016/0176622 A1 | 6/2016 | Vertsteylen et al. |
| 2016/0339281 A1* | 11/2016 | Muenzenberger ..... H02G 3/088 |
| 2017/0077467 A1* | 3/2017 | Kronke .................. H01M 10/63 |
| 2017/0120090 A1 | 5/2017 | Magnone et al. |
| 2017/0237054 A1 | 8/2017 | Mast |
| 2017/0335587 A1 | 11/2017 | Prendergast et al. |
| 2017/0361139 A1* | 12/2017 | Koreis .................. B64D 37/32 |
| 2018/0026245 A1 | 1/2018 | Page et al. |
| 2019/0044326 A1* | 2/2019 | Williams ................ A62C 3/16 |
| 2019/0046935 A1 | 2/2019 | Schwartz et al. |
| 2019/0344109 A1* | 11/2019 | Enk ...................... A62C 37/40 |
| 2020/0005956 A1 | 1/2020 | Pennington |
| 2021/0194072 A1 | 6/2021 | Krois et al. |
| 2021/0379428 A1 | 12/2021 | Tsutsui et al. |
| 2022/0158277 A1 | 5/2022 | Park et al. |

* cited by examiner

HAZARDOUS PRODUCTS CONTAINMENT SYSTEM AND METHOD

CROSS-REFERENCE TO RELATED APPLICATION(S)

This application claims priority to and the benefit of U.S. Provisional Application Ser. No. 62/760,573 filed Nov. 13, 2018, the entire disclosure of which is hereby incorporated by reference.

FIELD OF THE DISCLOSURE

The present disclosure relates to the containment systems. More particularly, the present disclosure relates to containment systems having thermal event suppression for hazardous products, such as batteries.

BACKGROUND OF THE DISCLOSURE

Hazardous products, such as batteries, are in increasing common use both commercially and recreationally, and may be present in a variety of conditions throughout the life of the batteries. Typically, batteries in use during their typical lifetime present little risk to consumers or other users when the batteries are operating in a normal environment.

However, these batteries may contain properties that can be hazardous in non-typical situations, such as in the case of a thermal event such as a fire. In the case of such a thermal event, the batteries may become unstable and dangerous.

Batteries may come in various shapes and sizes, being designed for use with a variety of different products. In many instances, batteries are stored or shipped in large quantities during the manufacturing and supply chain processes of consumer electronic devices. Accordingly, in some instances, a thermal event occurring at the location of a large storage of batteries could be catastrophic, resulting in the loss of a large quantity of batteries if the fire spreads, or leading to a large hazardous material situation.

Batteries may be stored at a warehouse or factory in some cases, and in other cases, batteries may be stored in shipping containers during transit. In either case, the occurrence of a thermal event may occur in the absence of direct monitoring by emergency service personnel or users trained in the process of containing the thermal event.

Accordingly, there is a need for a hazardous material containment system that can reduce or otherwise mitigate the deleterious effects of a thermal event related to hazardous materials or products such as batteries.

From the following figures, descriptions, and claims, other technical features may be readily apparent to one skilled in the art.

Before undertaking the DETAILED DESCRIPTION below, it may be advantageous to set forth definitions of certain words and phrases used throughout this patent document. The term "couple" and its derivatives refer to any direct or indirect communication between two or more elements, independent of whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or portions thereof adapted for implementation in a suitable computer readable program code. The phrase "computer readable program code" includes any type of computer code, including source code, linked or linkable code, object code, and executable code. The phrase "computer readable medium" includes any type of medium capable of being accessed by a computer, such as read only memory (ROM), solid state device (SSD) memory, random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as to future uses of such defined words and phrases.

SUMMARY

This section provides a general summary of the present disclosure and is not a comprehensive disclosure of its full scope or all of its features, aspects, and objectives.

In one aspect, a containment system for a hazardous product is provided, the system comprising: a housing unit for storing the hazardous product; one or more sensors for detecting an incipient or actual thermal event within the housing unit; an active fire suppression system, configured to suppress the thermal event based on environmental event information received from the sensors; a passive fire suppression system configured to suppress the thermal event using passive suppression; and, a controller in communication with the sensors and configured to detect a thermal event based on information received from the sensors, the controller configured to activate the active fire suppression system.

In another aspect, a method for operating a containment system for a hazardous product is provided. The method includes the steps of: at a controller, detecting, via signals received from a sensor, an occurrence of a thermal event within a housing unit for storing a hazardous product;

operating a passive fire suppression system in response to the occurrence of the thermal event; detecting, via the sensor, that the thermal event exceeds a predetermined threshold level; in response to detecting that the thermal event exceeds a threshold level, activating an active fire suppression system and suppressing the thermal event.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
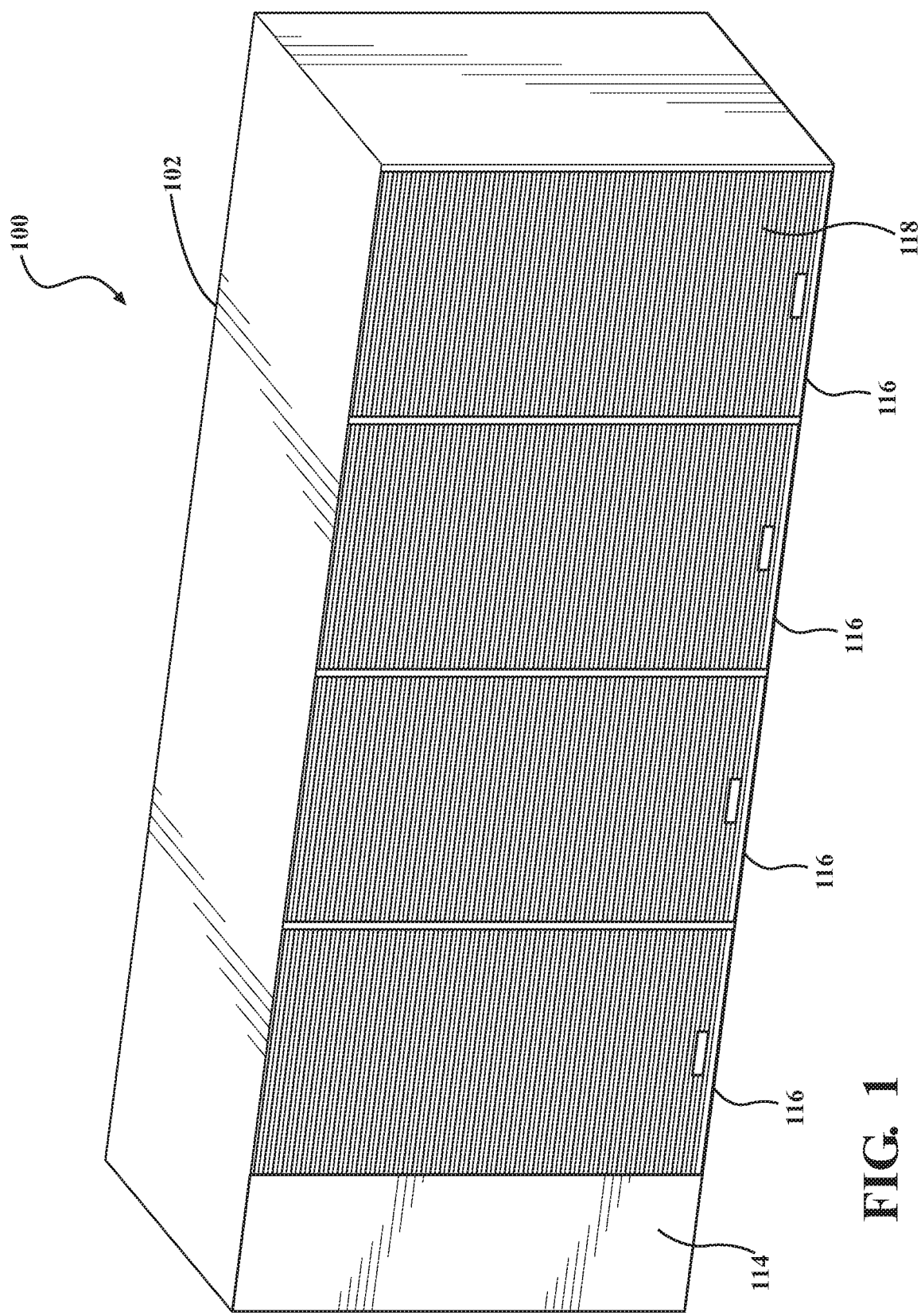
FIG. 1 is a perspective view of a hazardous material containment system including a housing unit for a hazardous material, the housing unit illustrated in the form a shipping container.
Figure 2:
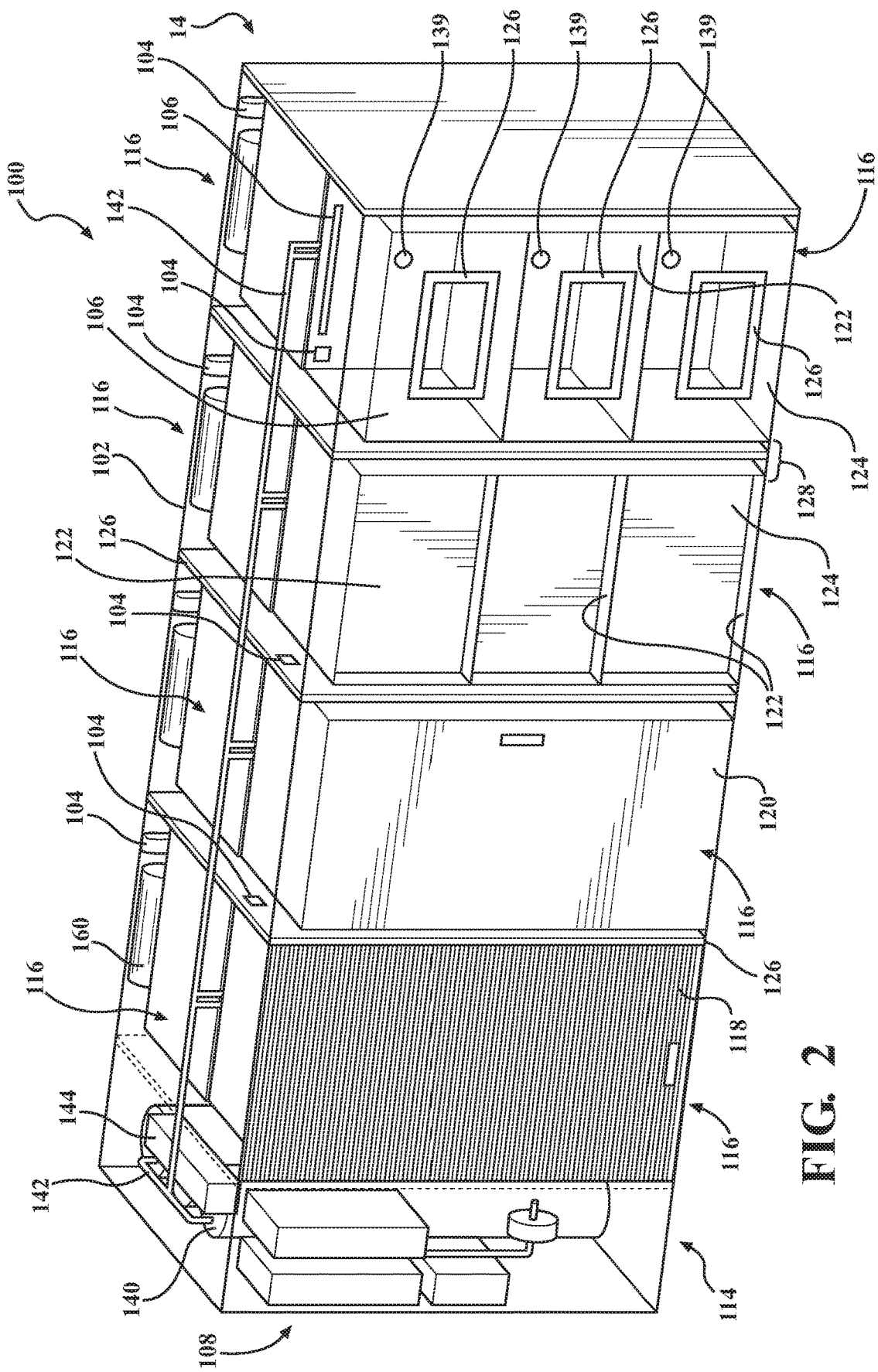
FIG. 2 is another perspective view of the shipping container, with certain portions removed for clarity, illustrating a plurality of sections and compartments within the shipping container, including sensors and passive and active fire suppression systems.

With reference to FIGS. 1 and 2, a containment system 100 is provided configured to store hazardous materials, such as batteries. The containment system 100 may include a housing unit 102, one or more sensors 104 for detecting a thermal event within the housing unit 102, a passive fire suppression system 106, an active fire suppression system 108, a communication system 110 configured to provide notifications of a thermal event to a third party, and a power supply 112.

As illustrated in FIG. 1, the housing unit 102 may be in the form of a shipping container. Shipping containers are in common use for transporting various materials and products, and can take on different sizes and shapes depending on the size and quantity of goods being transported and the method of transportation. It will be appreciated that the illustrated shipping container version of the housing unit 102 is but one example of the housing unit 102, and that the housing unit 102 may take on different sizes, shapes, and forms without departing from the spirit and scope of this disclosure. For purposes of further discussion, the shipping container form of the housing unit 102 will described herein.

In one aspect, the housing unit 102 may include various sub-units of sections that are divided relative to each other. In one aspect, the housing unit 102 may include a first section or operations section 114. The operations section 114 may include various components configured to process and control the system 100, such as components related to the passive and active fire suppression systems 106, 108, the communication system 110, and the power supply 112. The operations section 114 may also include further components related to the operational capability of the housing unit 102. As illustrated, the operations section 114 extends generally fully across the lateral width of the shipping container, but it will be appreciated that the operations section 114 may have a different width. In one aspect, the operations section 114 is disposed at one end of the housing unit 102, but the operations section 114 could also be disposed at other locations. In one aspect, a single operations section 114 is disposed within the housing unit 102, but in another aspect more than one operations section 114 may be used having redundant components or the components may be split between multiple sections 114.

The housing unit 102 may further include one or more storage sections 116. The storage sections 116 may be configured to store the hazardous materials that are being stored and/or transported by the housing unit 102. As illustrated, the housing unit 102 includes eight storage sections 116, with four on one lateral side of the shipping container and four on the other lateral side of the shipping container. However, it will be appreciated that different quantities and arrangements of storage sections 116 may be used depending on the desired size of the storage sections 116. The storage sections 116 may be disposed in a symmetrical manner across the center of the housing unit 102, or may be asymmetrical. The storage section 116 may be separated by a divider, or one space may house both laterally opposed storage section 116.

As shown in FIG. 2, the storage section 116 may include multiple doors for providing access to the interior of the storage section 116 and enclosing the storage section 116. In one aspect, an outer door 118 is disposed at a laterally outer portion of the storage section 116. The outer door 118 may define the outer surface of the housing unit 102, and may be in the form of a roll-up type door, or the like. In another aspect, the outer door 118 may be pivotable about a traditional door hinge.

The storage section 116 may further include an inner door or rack door 120 disposed laterally inward relative to the outer door 118. The rack door 120 may be exposed when the outer door 118 is in an open position. The rack door 120 may be pivotable about a hinge, and is preferably of a solid construction to sufficient enclose the space inside of the rack door 120, provide an additional layer of protection in case of fire, and to create a stable environment for the fire management processes. When the outer door 118 is in a closed position, the rack door 120 is typically not exposed to exterior elements, such as rain or the like.

The rack door 120 is openable to provide access within the storage section 116. When opened, the rack door 120 may provide access to a plurality of "cubbies" or compartments 122 configured to hold a hazardous material module 124. The compartments 122 may be various sizes and shapes depending on the size of the module 124. As shown, the compartments 122 are generally the same size. The compartments 122 may define a rack-like structure such that the modules 124 may be easily inserted and retrieved from the compartment. In one approach, the compartments 122 may be in the form of shelves that separate the storage section 116.

The modules 124 may have a generally box-like structure, and may define an interior space therein. Within the interior space, the modules 124 may include a support frame 126 or the like. The support frame 126 may take on various shapes and sizes depending on the size/shape of the hazardous material being disposed within the module 124. The hazardous material may therefore be suspended within the module 124 and spaced away from the sidewalls of the module 124.

The above described arrangement allows for the compartmentalizing of thermal events that may occur within one of the storage sections 116 and/or within one of the modules 124. For example, if a thermal event occurs within one of the modules 124, the thermal event may be contained within the module 124 and limited from spreading to adjacent modules 124 within the same storage section 116. Similarly, in the case of a thermal event within one storage section 116, the thermal event may be limited from spreading to adjacent storage sections 116.

In one aspect, the storage sections 116 may be separated from each other by an expansion member 126 delimiting the storage sections 116 relative to each other. The expansion member 126 may therefore act as a wall between the storage section sections 116. The expansion member 126 may be configured to expand in response to a thermal event occurring within the storage section 116, thereby assisting in the containment of the thermal event 116. In one aspect, the modules 124, when disposed within the storage space 116 or within the compartments 122, are spaced away from the expansion members 126, such than an air extension space 128 is defined adjacent the expansion members 126.

The thermal event, such as a fire, may be limited through the use of the passive fire suppression system 106 and/or the active fire suppression system 108. In one aspect, the passive fire suppression system 106 may begin suppressing the thermal event prior to the active fire suppression system 108 suppressing the thermal event. In some cases, the passive fire suppression system 106 may suppress the thermal event without requiring the use of the active fire suppression system 108.

The housing unit 102 may further include a plurality of sensors 104 disposed throughout the housing unit 102 and/or the modules 124. FIG. 2 illustrates sensors 104 distributed in both types of locations, and it will be appreciated that the sensors 104 may be distributed throughout the housing unit 102 at additional locations, as desired. In one aspect, the sensors 104 are disposed within each compartment 122, such that a thermal event within a particular compartment 122 occurring at a particular module 124 may be detected. In another aspect, the sensors 104 may be disposed within each storage section 116, such that a thermal event within a particular storage section 116 may be detected. The sensors 104 may be configured to detect an increase in temperature above a threshold level or the presence of a flame, for example. It will be appreciated that other sensor types or capabilities may also be used.

Figure 3:
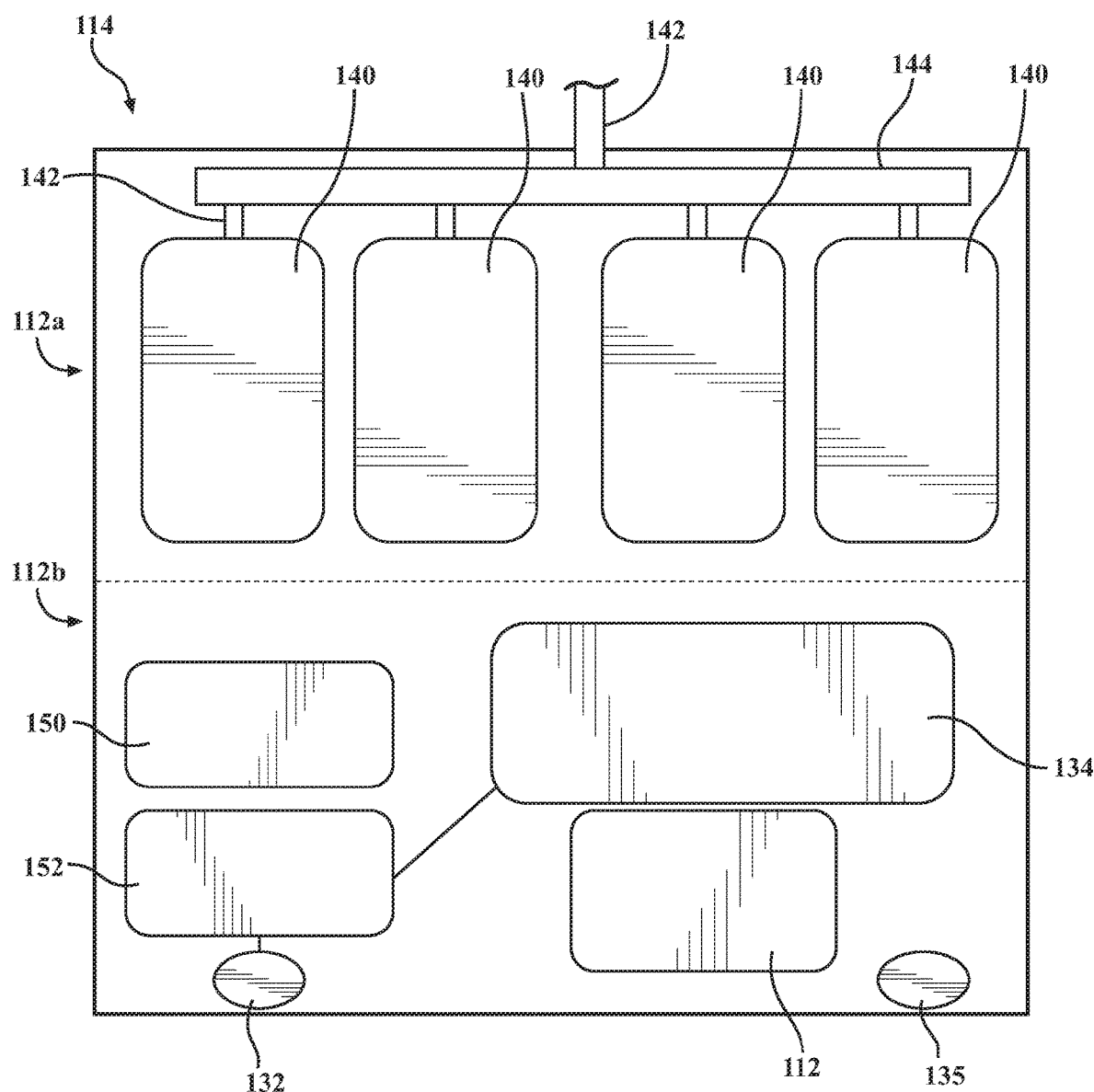
FIG. 3 is a schematic end view of the shipping container illustrating an operations section of the shipping container, which includes control components and components of the active fire suppression system.
Figure 4:
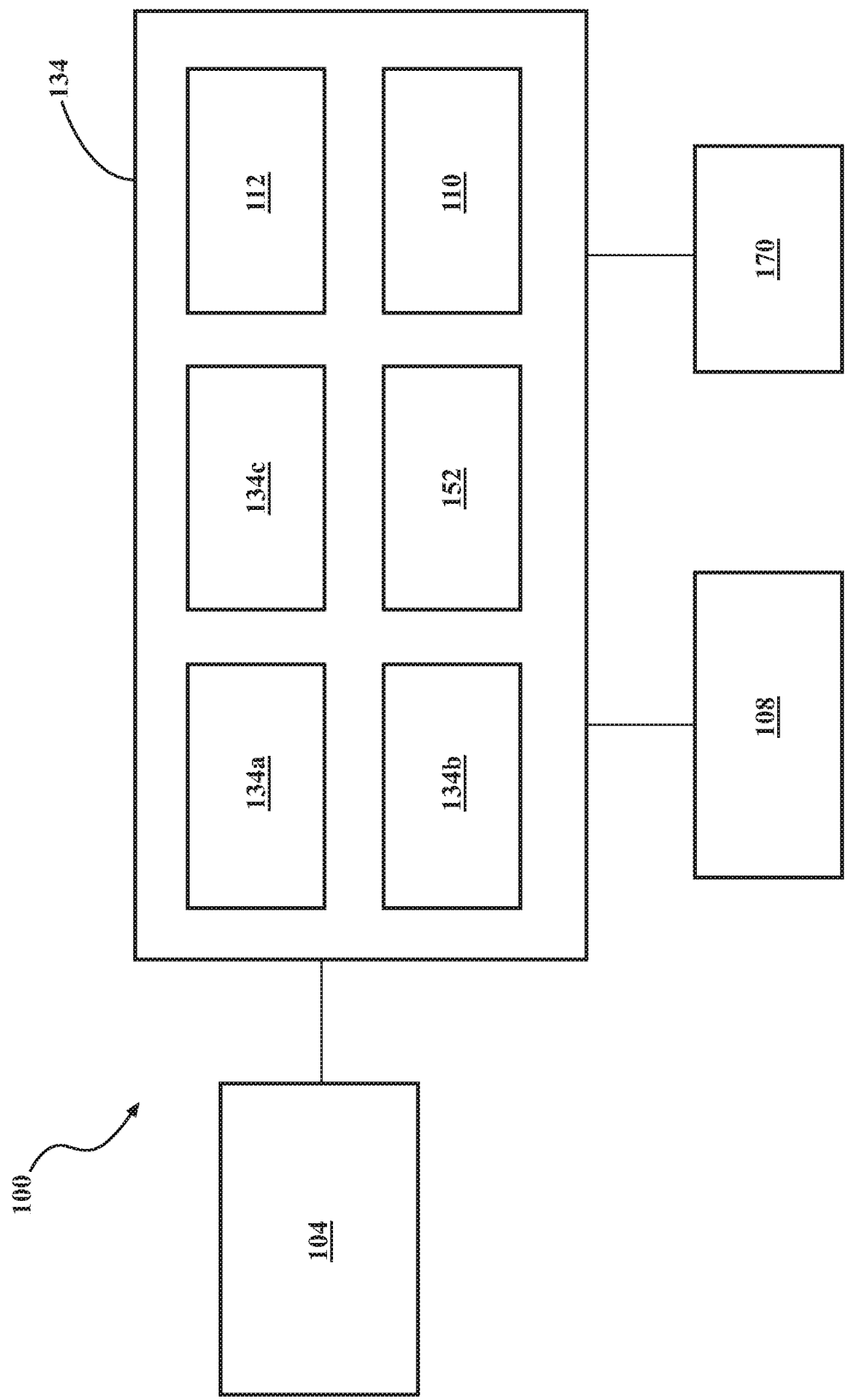
FIG. 4 is a schematic block diagram of the containment system.

In one aspect, the sensors 104 are hardwired via a wire harness 132 that extends between the sensors 104 and a controller 134 disposed within the operations section 114. The controller 134 may be in the form of a computer or similar processing device, which may be in the form of a single unit within various modules for providing various functionality, or may be in the form of multiple separate physical modules that are in communication with each other. The operations section 114 illustrated schematically in FIG. 3 illustrates the communications module 110, detection module 152, power supply 112, and controller 134 as separate components. It will be appreciated that each of these components may also be part of a single component (as illustrated in FIG. 4). In the case of separate components, as illustrated in FIG. 3, the various modules and components may be hardwired or otherwise in communication. A further wire harness 135 may be disposed at the bottom of the operations section to interconnect separate components.

FIG. 4 illustrates a schematic block diagram of the controller 134 and its operative communication and connection with various components of the system 100. FIG. 4 illustrates the controller 134, which as shown in FIG. 4 may include a processor 134$a$, a memory 134$b$, a network interface card 134$c$. The controller 134 is operatively connected to the sensors 104 to receive data from the sensors 104. The controller 134 is further operatively connected to the active fire suppression system 108 to activate the various capabilities of the active fire suppression system 108 described herein. The controller 134 is further connected to an alarm system 170. The controller 134 may further include a detection module 152, described further below, and the communications module 110 for communicating with first responders or other stakeholders.

It will be appreciated that various types of interconnected processors or processing modules may be used to provide the described functionality of the system 100 and the controller 134. In one aspect, the wire harnesses 132 and 135 are predominantly disposed along the bottom of the housing unit 102 in order to shield the wire harnesses 132 and 135 from increased heat resulting from a thermal event in one or more area of the housing unit 102.

In another aspect, the sensors 104 or communications module 110 may communicate with the controller 134 wirelessly via a radio signal or other wireless communication standard.

The sensors 104 are typically used for communicating the existence of a thermal event such that the active fire suppression system 108 may be activated by the controller 134. However, as described above, the system 100 also includes the passive fire suppression system 106 that may effectively suppress the thermal event at an early stage of the thermal event. The active fire suppression system 108 may still be activated after the passive fire suppression system 106 has operated.

The passive fire suppression system 106 may be in the form of various components or materials disposed throughout the housing unit 102. FIG. 2 illustrates the passive fire suppression system 106 both as applied to a surface of the housing unit 102 (particularly a surface of the module 124 or compartment 122, as well as in the form of a pipe disposed within a compartment 122 or module 124. It will be appreciated that the passive fire suppression components described herein may be disposed throughout the housing unit 102 in various locations or on various surfaces.

In contrast to the active fire suppression system 108, passive fire suppression methods require no external inputs, action, or active energy and are part of the structure already in place and installed within the housing unit 102. The passive system 106 includes the compartmentalizing of the containment system 100 into smaller sections for containing a thermal event within that section and slows the spread of the thermal event to other sections or areas of the containment system 100. This helps in limiting the amount of damage done to devices placed in the containment system 100 for transport or storage.

The passive system 106 used in the system 100 may include one or more of intumescent lining material, fluid filled tubing, phase change materials, ceramic liners, and vent systems.

Intumescent materials expand in volume when exposed to high temperatures (often by releasing trapped water vapor). During a thermal event, the expanding intumescent material expands into a char. Char is a poor conductor of heat and retards heat transfer. In this containment system 100, the intumescent material insulates and helps to limit heat spread from compartment 122 to compartment 122, and may further limit heat from inside the housing unit 102 to the outside surface. Thus, the intumescent material may be disposed on the surfaces of the compartments 122. The intumescent material may also be disposed on the surfaces of the modules 124, either inside the module 124, outside the module 124, or both.

Additionally, the volume expansion of intumescent material displaces flammable gases from within the compartment 122, thereby reducing the risk for explosion. In one aspect, the intumescent material can be packed around parts, painted or coated on to the parts of the system, placed between walls, seals or gaskets, or be part of the manufacture makeup of the walls, other structure, etc.

Another component that may be used in the passive system 106 may be fluid filled tubing. In one aspect, the fluids may be contained in the tubing and under pressure. In response to a temperature rising above a threshold level, the fluid within the tubing will be released. The fluid within the tubing may be any fire suppressing material. The tubes may be disposed within one or more of the compartments 122, the modules 124, or the sections 116. In the event the hazardous material such as a battery begins to undergo a thermal runaway condition, the increase in temperature caused by such a thermal runaway, or an open flame, may result in an increase in temperature at the tubing, causing the tubing to rupture automatically in response such that the fire suppressing fluid material may leak or flow onto the malfunctioning battery within the compartment 122 or module 124. The fire at the battery may thereby be suppressed by being cooled down by the fluid material. The tubing in this case may be weaved throughout multiple compartments 122 or sections. Alternatively, separate sections of tubing may be disposed in separate sections of the housing unit 102, compartments 122, or modules 124.

The passive system 106 may further include phase change materials. Phase change materials are substances which absorb or release heat when they go through a change in physical state. In the containment system 100, the compartments 122 may be lined with solid materials that have the ability to absorb a large amount of heat by phase transitioning from solid to gas. These materials ablate or lose volume by using heat to boil off the surface over time. The phase change materials may be disposed throughout the housing unit 102 at various locations or sections, as described above with reference to the other passive fire suppression materials.

The passive system 106 may further include ceramic lining material. Ceramic liners have been developed to withstand high temperatures. Accordingly, this material can be used to hold batteries, insulate compartments 122, and offer passageways through which fire suppressants can be delivered locally. The ceramic material may not suppress an existing fire, but may be used to withstand an existing fire and prevent propagation of the fire to other locations within the housing unit 102.

The passive system 106 may further include passive ventilation devices. Passive ventilation systems may be in the form of one-way pressure valves or temperature sensitive valves. In the case of a thermal event, such as a fire, the passive ventilation devices may allow the hot gases produced by the thermal event to exit the area of the thermal event, such as outside of the section in which the thermal event is occurring.

It will be appreciated that one or more of the components of the passive system 106 may be used in combination with each other, and that the system 100 may not necessarily include each of the passive components described above. Additionally, different areas of the housing unit 102 may use different types of combinations of the passive components described above.

With reference now to the active suppression system 108, the active system 108 may be triggered by thermal events, such as an increase in temperature or a fire. The sensors 104 described above may be disposed at various areas of the housing unit 102 for detecting a thermal event and communicating with the controller 134 to activate one or more components of the active system 108.

The active system 108 may operate to actively introduce a fire suppressing material into the area where the thermal event is detected by a corresponding sensor 104. The active system 108 may further include active venting, such as by actively opening a vent 139 by sending a signal from the controller 134 to an active vent or valve member.

The active suppression of thermal events may be accomplished by introducing suppressant materials on heated area. The active fire protection system 108 takes action to assist in eliminating the fire by using various dispensers to administer fluids, inert gases, powders, and/or foams to a specific area in which the thermal event is detected, or globally in some cases where the thermal event is not sufficiently suppressed. Other active methods may include alarms, fans, venting coupled to a flame arrestor, etc.

One type of active suppression includes the provision of fluids, such as water or other fire suppression fluids (such as F500 from Hazard Control Technologies), to determined hot spots or locations of the thermal event. The effect of such provision of fluids is to absorb heat by the fluid/water and create stream, thereby causing a phase change from liquid to gas, and minimizing or reducing the risk of an open flame. The water or other fluid may be applied locally or globally, as described above, such as to a specific compartment 122 or section 116 or to multiple compartments 122 or sections 116, including all of the compartments 122 or sections 116, if necessary.

The provision of fire suppressing materials, such as water or other fluid, can be applied through a network of tubing and/or nozzles, and may be distributed as a mist or a direct flow of water/fluid to flood a specific section of the housing unit 102.

With reference to FIG. 3, the operations section 114 may include various components of the active suppression system 108. The operations section 114 may include one or more reservoirs 140 mounted therein. The reservoirs 140 may include different fire suppression materials, or multiple reservoirs may include the same fire suppression materials. As illustrated in FIG. 3, four reservoirs 140 are disposed within the operations section 114. The reservoirs 140 may be in the form of canisters, which may be under pressure depending on the material contained therein, or may be attached to a pump. It will be appreciated that the canisters may be used in a manner known in the art to provide the material contained therein, either by way of pressurized fluid or the use of pump or similar device.

The reservoirs 140 may be coupled to tubing 142 extending therefrom through which the fire suppressing material is delivered to the desired locations. The tubing 142 from each reservoir 140 may be routed to each compartment 122 and/or section 116 to provide for local and/or global provision of the fire suppressing material contained within the reservoir 140. The tubing 142 may include various branches for reaching each of the compartments 122, with nozzles disposed at the ends of the branches for providing the fire suppressing material to the selected area.

In one aspect, the tubing 142 extending from each of the reservoirs 140 may be routed to a manifold 144, from which the tubing 142 continues to the various areas of the housing unit 102. Accordingly, a common network of tubing 142 may extend from the manifold 144 to the various areas that can deliver each type of material. Thus, a material from one of the reservoirs 140 may be delivered during one period of time while the other reservoirs are closed off from the manifold 144, and different reservoirs may deliver their material at a different period of time. Thus, by using the manifold 144, the total amount of tubing in the system 100 may be reduced.

In one aspect, the reservoirs 140 may include inert gas, a fluid, a powder, or a foam. The number of reservoirs 140 in the system 100 may vary depending on the amount and type of fire suppressing material that is desired.

In one aspect, inert gas may be used to stop the spread of fire to nearby flammables, e.g. plastics. Inert gases typically have a minimal effect on the battery in thermal runaway as the flammable mixture is created in the battery, away from external gases. Instead, inert gases can be helpful to stop the spread of fire to nearby flammables, such as plastics, as can help remove heat via a venting system. Inert gases can also reduce the concentration of flammable gas, thereby reducing the risk of explosion. Some types of inert gases that may be used in the containment system 100 include, but are not limited to, nitrogen, argon, and $CO_2$. The inert gas may be compressed or pressurized within the reservoir 140.

In one aspect, water may be provided within the reservoir 140, as described above. Alternatively, other fire suppressing liquids (F500, for example) may be used. The water or other fire suppressing liquid may not be pressurized within the reservoir, and therefore a pump may be disposed in cooperation with the reservoir 140 to provide the water or other fluid via the tubing 142.

In one aspect, a fire suppressing powder may be disposed within the reservoir 140. The types of powder that may be used in the system 100 include, but are not limited to, sodium bicarbonate, monoammonium phosphate, potassium bicarbonate. Some metal powders have been shown to be effective in absorbing heat near a battery surface and moving the heat away from the battery surface, where the heat can more easily dissipate. Other powders may be useful for fire suppression by other mechanisms such as chemical inhibition, cooling, and asphyxiation effects. Other powders can be formulated to absorb toxic and explosive gases. Powders may be used in combination with inert gases and/or fluids for greater effect.

In one aspect, foam may be disposed within the reservoir 140. Foam may be used as an effective fire extinguishing medium by the combined mechanisms of cooling, separating the flame/ignition source from the product surface, suppressing vapors and smothering. Fire suppression foams have a high heat tolerance and work by limiting heat spread to a local area. The effect is that fire propagation is very limited. Additionally, foams can provide further protection by displacing any collection of flammable gases, thereby reducing local concentration of gas and explosion risk.

It will be appreciated that other types of fire suppressing materials not discussed in detail above may be provided in one or more reservoirs 140 of the system 100 for being provided as part of the active suppression system 108.

As described above, the reservoirs 140 are disposed within the operations section 112. The operations section 112 may be divided into two sub-sections 112*a* and 112*b*, such that the reservoirs are substantially isolated from the controller 134 and other related electronic components to reduce the potential for spillage or the like from the reservoirs 140 to reach the electronic components.

The operations section 112 may have various service panels for accessing the reservoirs and/or the electronic components. The reservoirs 140 may include individual sensors for determining an amount of material present in the reservoir to enable the system 100 to determine when the reservoirs 140 may need to be re-filled or to monitor the amount of material that has been used.

The sub-section 112*b* may include the various electronic components, such as the power supply 112 and the controller 134. The system 100 may further include a GPS module 150 configured to perform GPS tracking, and which may include various communication devices, which may include wireless communications devices such as cellular devices or may be in communication via a wired connection to the controller 134, which may have its own communications system 110.

The system 100 may further include a detection control module 152 for detecting the occurrence of hear and/or flame. The detection control module 152 may be in communication with the various sensors 104 to receive data from each of the sensors 104 to monitor and detect the occurrence of a thermal event based on the data received form the sensors. The detection control module 152 may be in communication with the controller 134 via wireless communication or wired communication. As described above, the various control modules described herein may be separate modules or virtual modules contained within one or more computing devices.

Based on data or information received and analyzed by the detection module 152 and the controller 134, the system 100 can thereby respond to a thermal event in an active manner and control the active suppression system 108 to provide fire suppressing materials or active fire suppressing vents or the like. The manner of control may be controlled by a predetermined algorithm, and may include machine learning or artificial intelligence to modify the predetermined algorithm if desired based on the results of fire suppressing efforts.

The type of fire suppression and the control of the fire suppression may be one of a variety of predetermined fire suppression algorithms. The selection of the fire suppression algorithm may be based on customer input or other requirements allowing for a tailored user experience. For example, suppression algorithms can be pre-assigned and the customer may choose which preset is closes to their anticipated situation. Alternatively, the device could query the user on the risk issues and build the algorithm to match the customer's concerns or needed parameters for their system.

The controller 134, using an algorithm, may set up a sequence of steps or rules designed to produce a specific outcome from a set of inputs. These inputs can be instructions/preferences chosen by the customer on a dashboard display of a cell phone, computer, tablet, or application. The customer inputs may be combined with the inputs derived from the anatomy of the device/battery, and real-time inputs from the sensors 104 disposed within the system 100.

Customer inputs that may be considered by the controller 134 and the algorithm can include inputs related to the cargo or inventory, the operating environment, nearby risks, expected response time, the operating risk, and/or regulatory factors. In one aspect, customer inputs may be selected from a screen displaying each of the options for different categories, or may be selected from a drop-down menu or the like. It will be appreciated that various factors may be used by the controller 134 and the algorithm for determining the rules of the fire suppression system.

With regard to the cargo/inventory, the user may define: the battery type, such as a large or small format battery; the condition of the battery, such as new, refurbished, damaged, end of life; the chemistry of the battery, such as lithium based or other lithium-ion formulations; the value of the inventory, such as high or low value, new, or used.

With regard to the operating environment, the user may define: the container use, such as transportation or storage; venting availability, such as outdoors or indoors; and/or communications interruption, such as whether breaks in communication are expected.

With regard to nearby risks, the user may define: personnel nearby, such as workers; and/or flammable material nearby.

With regard to response time, such as how quickly first responders are available, the user may define: minutes, hour, days, etc.

With regard to operating period, the user may define: in transit or anticipated arrival.

With regard to regulatory compliance, the user may define any codes or standards that must be followed.

For whichever various customer inputs are available, the user may access a user dashboard or the like that is in communication with the controller 134 to update their inputs based on any changes in parameters of the product of the system 100. In the event of a change to the parameters, the algorithm may be altered to change the operation of the system 100.

It will be appreciated that various control algorithms may be used depending on the needs of the user. For purposes of discussion, various types of control operations will now be described.

Figure 5:
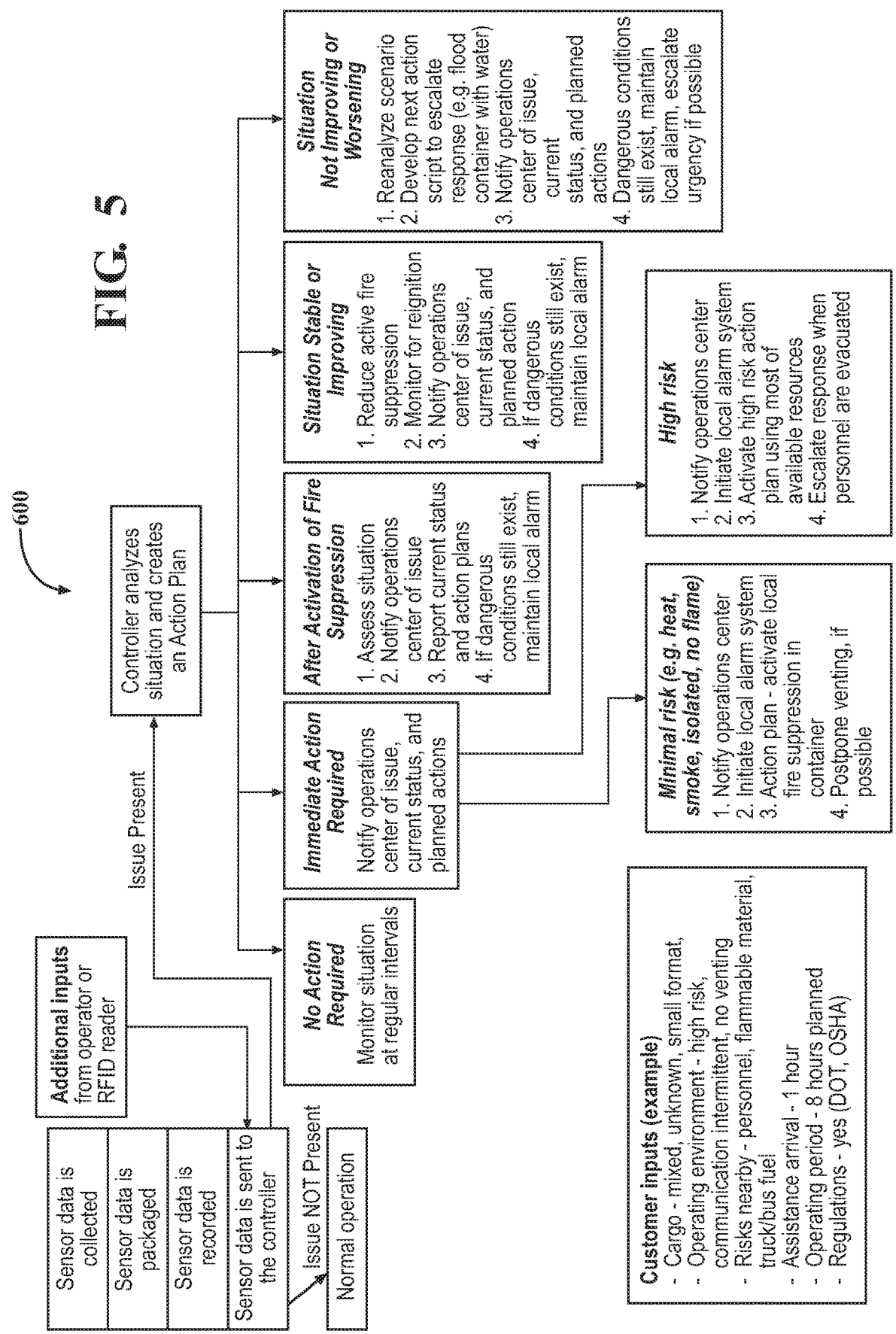
FIG. 5 illustrates one aspect of a method for suppressing a thermal event in the containment system.

With reference to FIG. 5, one method 600 of a fire suppression algorithm is shown, in particular for a situation where the housing unit 102 is in an environment with personnel and/or flammable material nearby. In this example, given the risk to personnel and an unknown risk from battery confines without venting, an initial response would be to not vent until necessary and sound alarms to evacuate. First responder response is approximately 1 hour, and given the presence of nearby flammable materials, fire suppression strategy would be to aggressively use available resources (when risk to nearby personnel is reduced).

Figure 6:
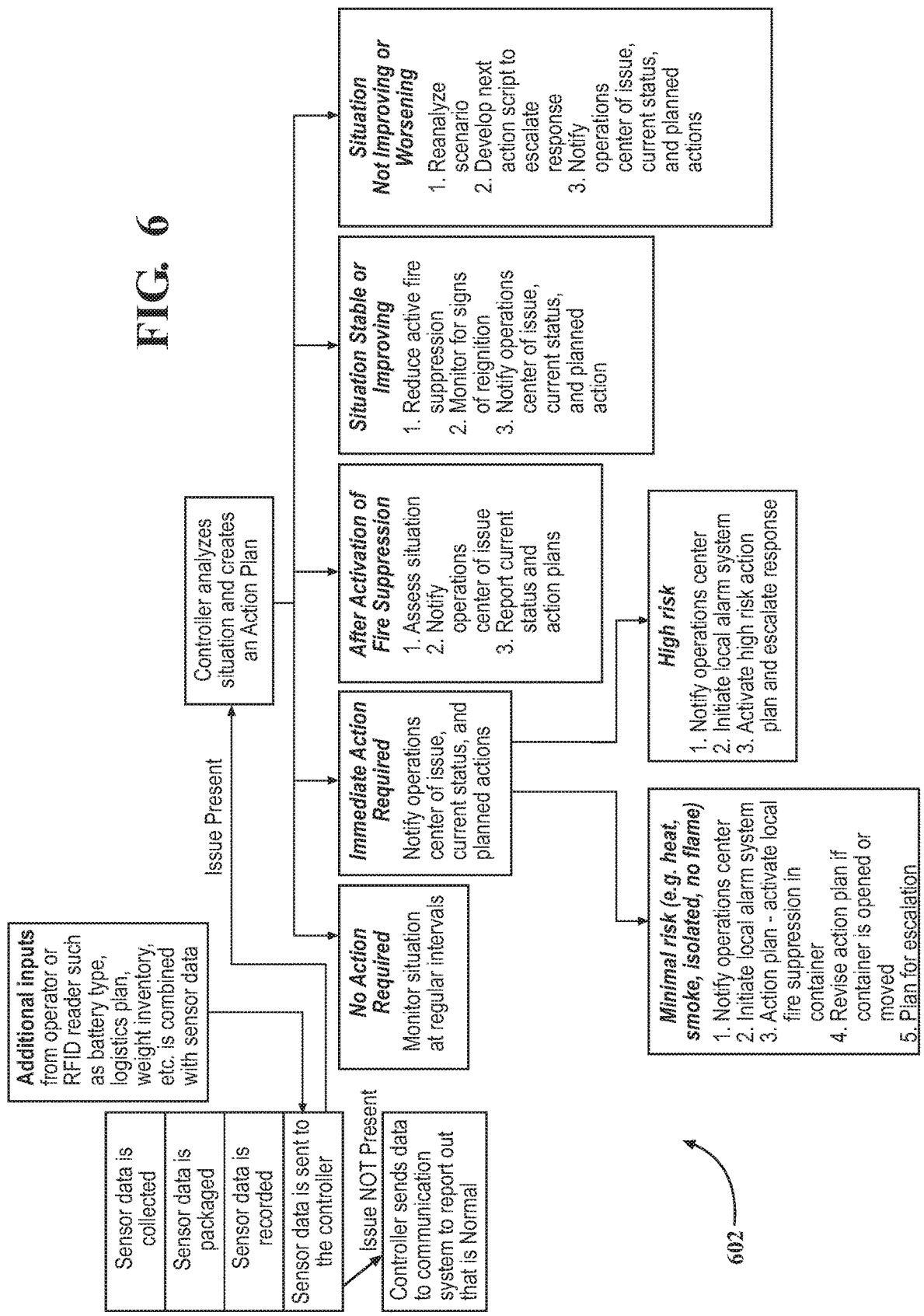
FIG. 6 illustrates another method for suppressing a thermal event in the containment system.

With reference to FIG. 6, another method 602 of a fire suppression algorithm is shown, in particular for a situation where the housing unit 102 is in a factory environment. In this example, location is known as are risks (nearby personnel) and resources. The system 100 may choose an action strategy to isolate risk by attacking a heat source location, notifying local operations manager and first risk responders about fire, gas, smoke, and risks. This is less than an "all-out" strategy and may give operations time to remove and save other batteries.

Figure 7:
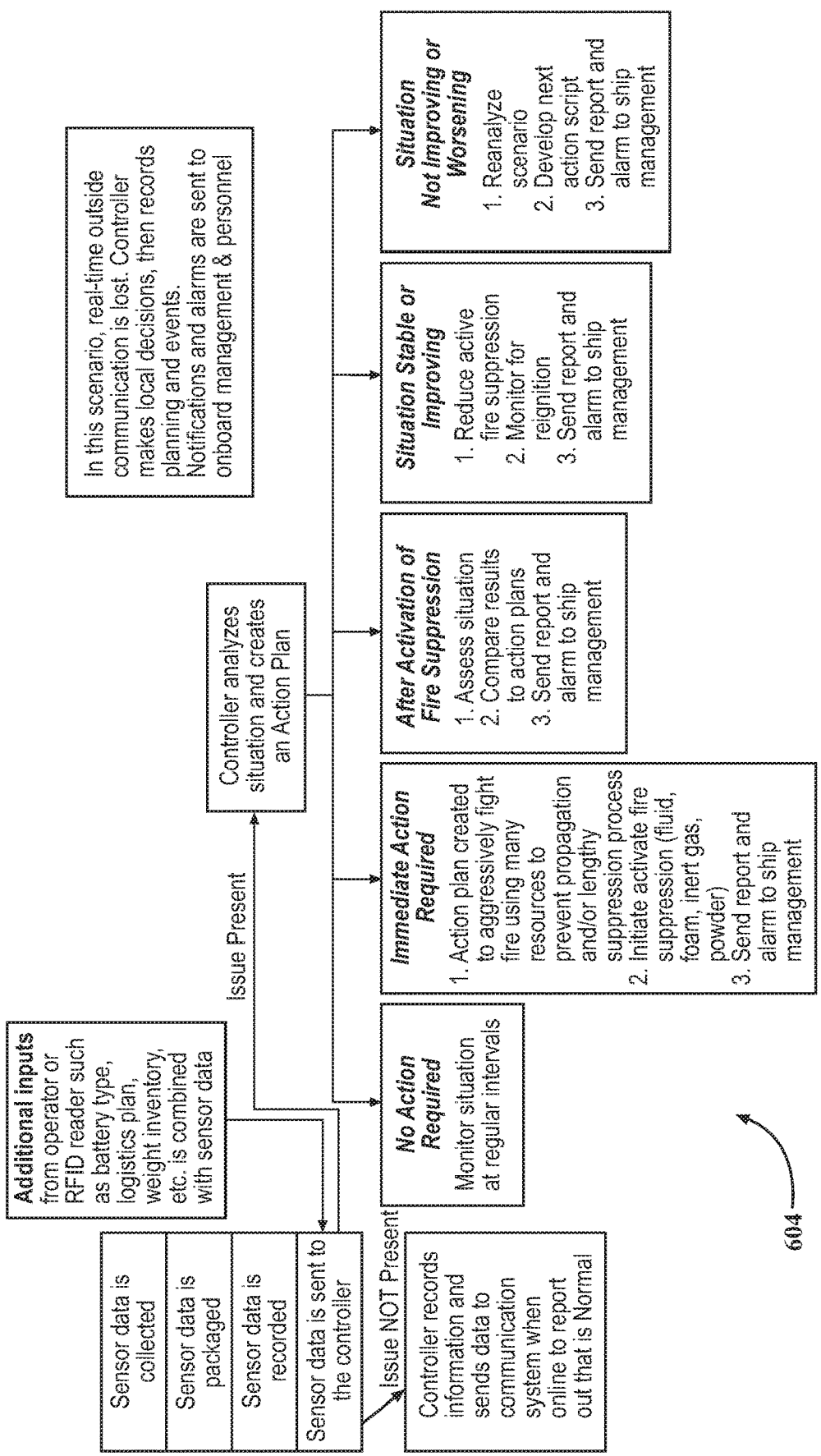
FIG. 7 illustrates another method for suppressing a thermal event in the containment system.

With reference to FIG. 7, another method 604 of a fire suppression algorithm is shown, in particular for a situation where the housing unit 102 is in an open ocean scenario. In this example, the system 100 may sense that there is no external communications link and choose an action which maximizes fire suppression, such as flooding the entire housing unit 102 and all of its inventory.

Figure 8:
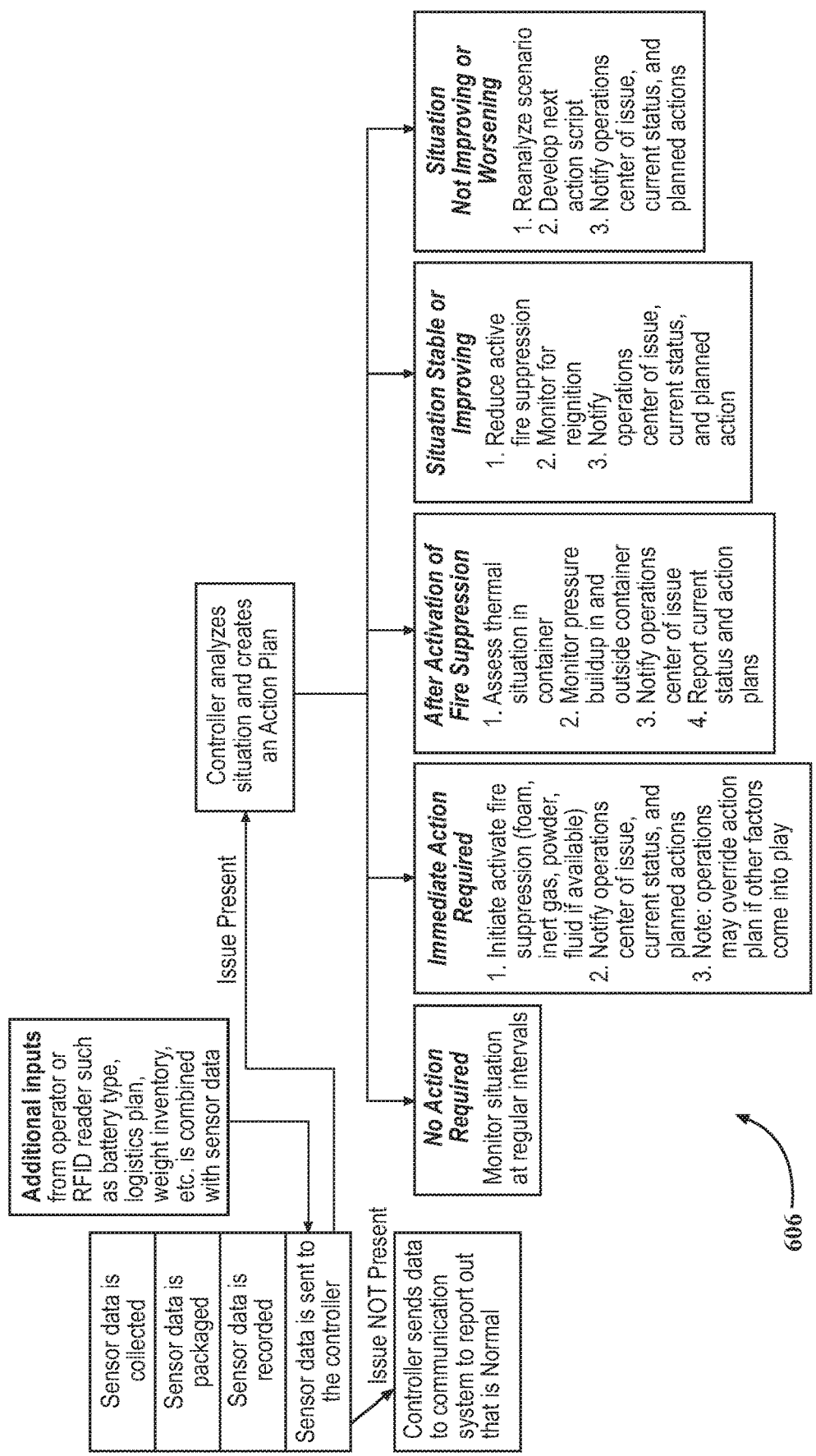
FIG. 8 illustrates another method for suppressing a thermal event in the containment system.

With reference to FIG. 8, another method 606 of a fire suppression algorithm is shown, in particular for a situation where the housing unit 102 is on an airplane. In this example, the housing unit 102 may be customized for a specialized environment (such as the fluid may not be used because of weight issues and over pressurization risk in a cargo area). The action strategy for a thermal event may rely more on passive suppression, such as intumescent linings and venting, to minimize risk that a more active suppression would create a high pressure situation in the container and cargo area.

Figure 9:
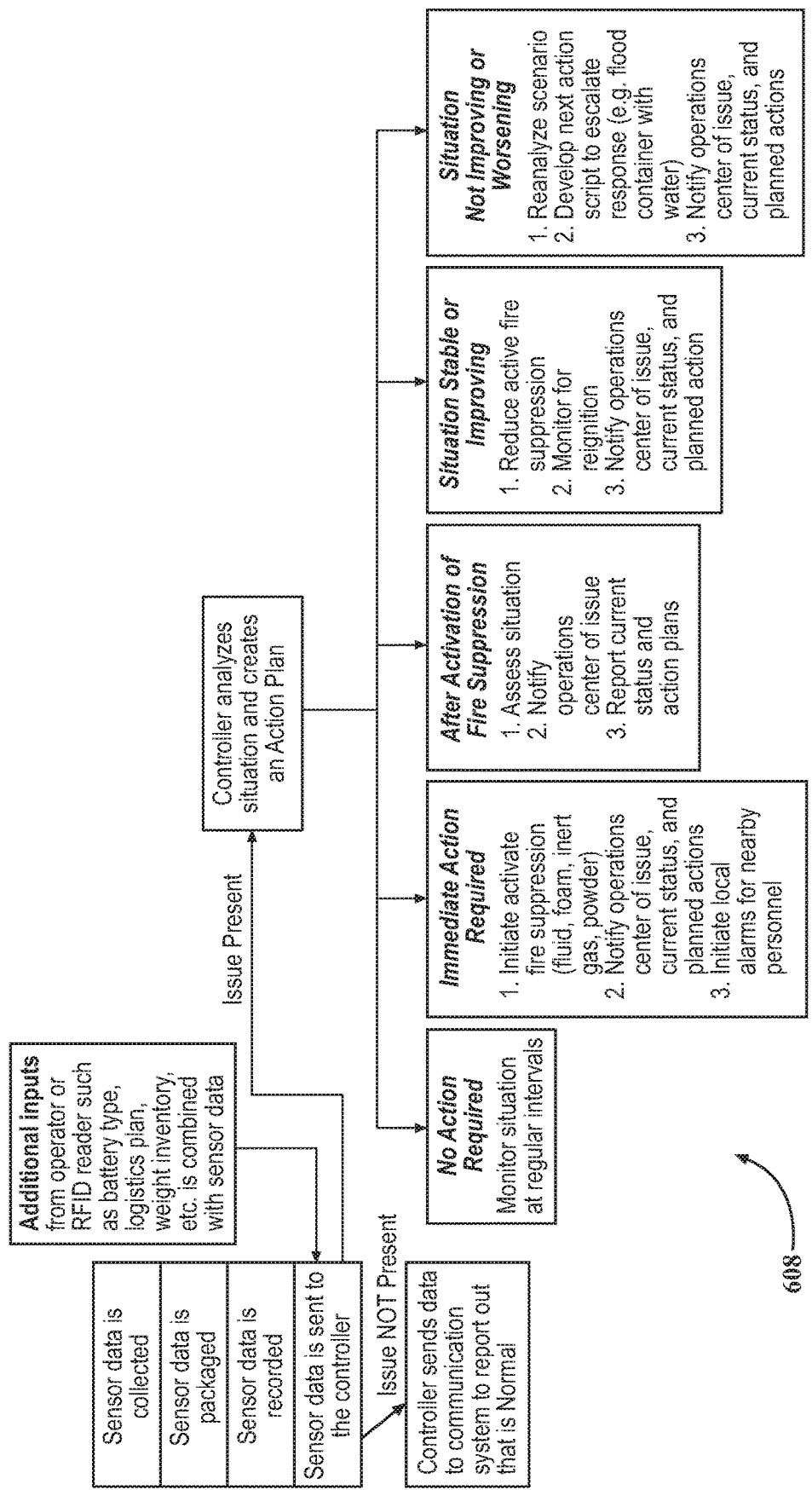
FIG. 9 illustrates another method for suppressing a thermal event in the containment system.

With reference to FIG. 9, another method 608 of a fire suppression algorithm is shown, in particular for a situation where the housing unit 102 is in a retail area. In this example, the container may include mixed inventory (such as recycled batteries) and batteries of different types and shapes. Given the risk to nearby personnel and an unknown risk from close battery confines, the fire suppression strategy may be more of an "all-out" approach to flood the container with suppressant and sound an external alarm system. Additionally, the system 100 may notify remote operations managers and first responders.

Figure 10:
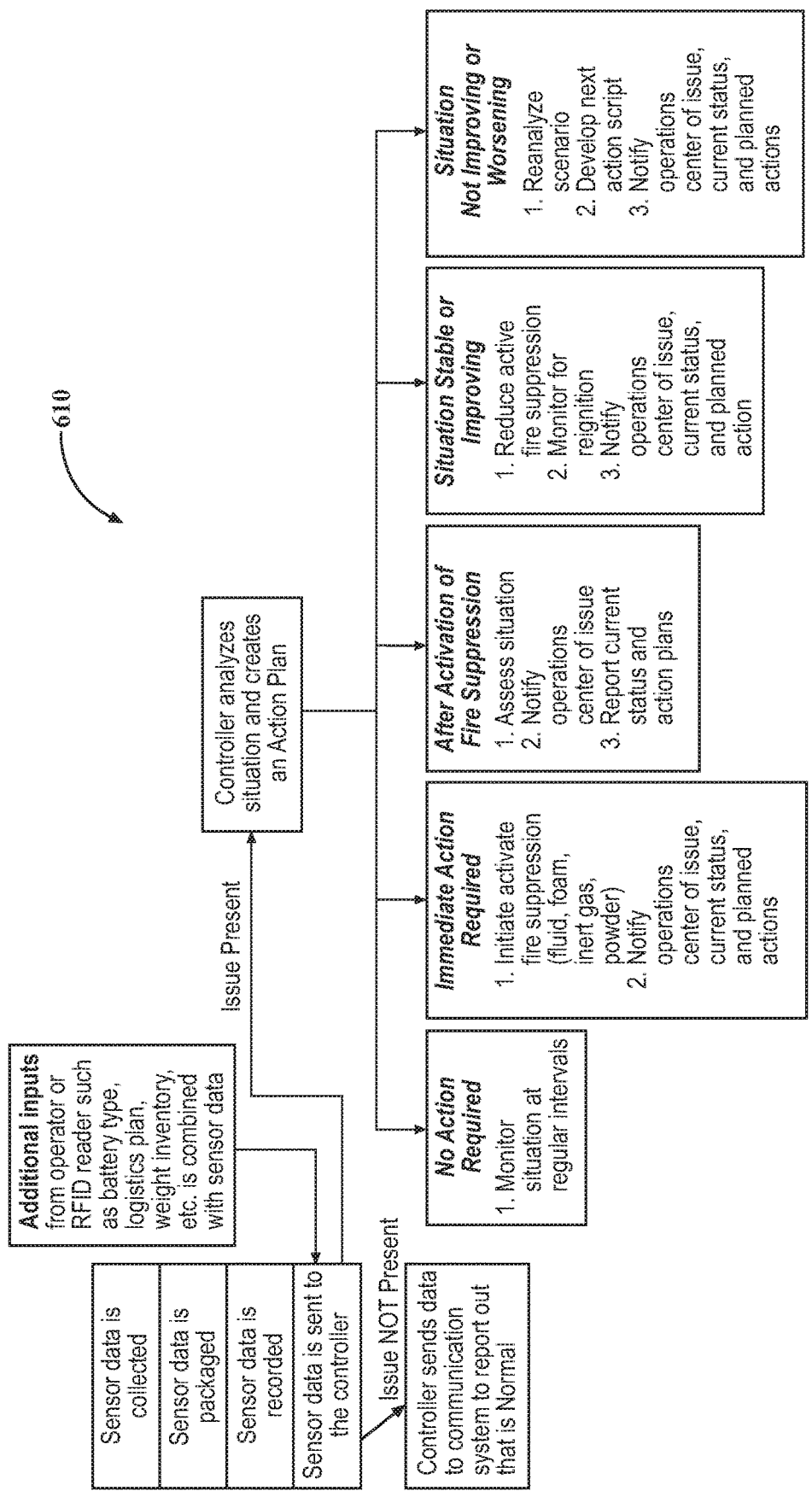
FIG. 10 illustrates a template for a method for suppressing a thermal event in the containment system.

Again, it will be appreciated that the algorithm may be specifically tailored to the precise environment taking into account various variables. A generic method template 610, shown in FIG. 10, may be used as a default algorithm, which may be modified in accordance with the determined variables present for each case.

Figure 11:
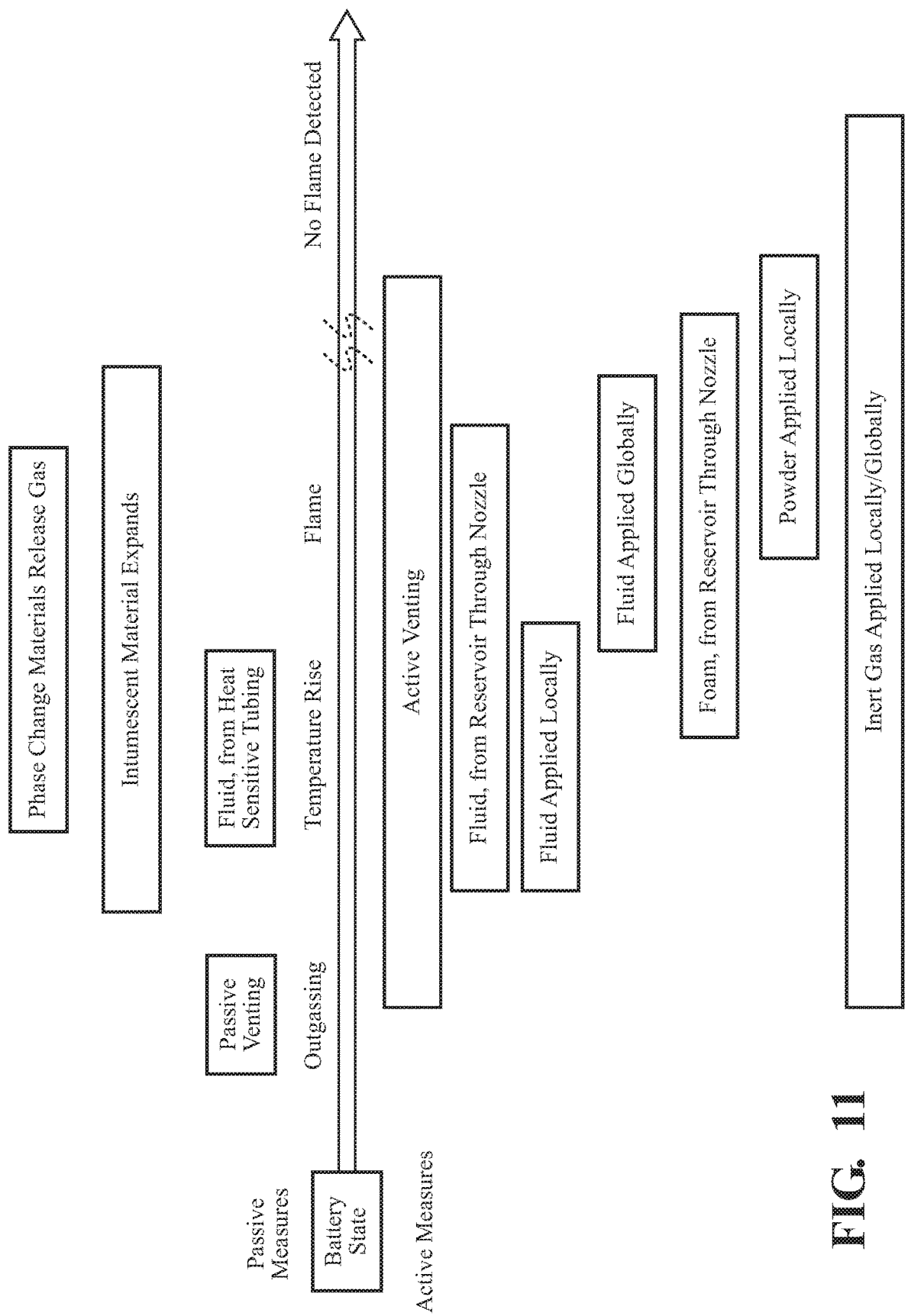
FIG. 11 illustrates one aspect of a progression of passive and active fire suppression events for use in the system.

With reference to FIG. 11, both passive and active fire suppression techniques may occur in the case of a thermal event, with the types of active and passive suppression techniques varying at different stages of the thermal event. The stages may include a first stage/outgassing, a second stage/temperature rise, a third stage/flame, and a fourth stage/no flame detected.

At a first stage of the thermal event, the thermal event may or may not be detected by the corresponding sensor 104 in the area of the thermal event. For example, the temperature may have risen, but may be below the predetermining temperature for instituting active suppression measures. In response to outgassing or the increase in temperature, passive venting may occur, thereby reducing the temperature.

In response to further increases in temperature, which may be considered a second stage of the thermal event, additional passive suppression measures may occur. For example, as temperature increases an additional amount, the heat sensitive tubing may rupture, thereby introducing fire suppressing fluid to the area of the thermal event. Typically, when the tubing has ruptured, the fluid will be distributed over a limited period of time, which may be a relatively short period. In this aspect, the fluid from the heat sensitive tubing may occur or this limited period of time during the second phase.

In another aspect, in response to temperature increases, the phase change materials may release gases during the second phase and into a third phase of the thermal event and temperature continues to increase.

In another aspect, in response to temperature increases, the intumescent material may expand, as described above, and may occur during both the second phase and the third phase.

The above described passive measures may occur alone or in combination based on the specific location of the thermal event relative to the location of the passive measures, or the amount of passive material present.

Additionally, or alternatively, the active suppression measures may also occur in response to detection of a thermal event by the sensors 104.

In one aspect, the active suppression measures occur in parallel with the passive suppression measures during the second and third phases, and may continue into a fourth phase of the thermal event.

In response to detection of the thermal event at the sensor 104, the controller 134 may cause active venting to occur during the first stage of the thermal event. The active venting may be maintained from the first stage through the fourth stage. The controller 134 may send a signal to one or more vents for the vents to open to allow high temperature air to exit the area of the thermal event.

In response to detection of the thermal event via the sensors 104, the controller 134 may cause an inert gas to be provided from the corresponding reservoir 140. The inert gas may be provided from the first stage of the thermal event to the fourth stage of the thermal event. In one aspect, the system 100 may include inert gas suppression canisters 160 (FIG. 2) disposed within each of the product sections 116, which may operate independently from the reservoirs 140, to enable provision of inert gas in the event other suppression materials are being provided via the manifold 144.

In response to detection of the thermal event via the sensors, the controller 134 may cause water/fluid to be applied from the reservoir 140 via the tubing 142. The water or fluid may first be applied locally to the area of the thermal event as determined by the sensors 104. The provision of water/fluid to be applied locally may occur during the second stage of the thermal event. Following local application, the fluid/water may be applied globally or at least to additional areas. For example, the controller 134 may provide fluid to adjacent areas to limit the potential spreading of fire beyond the initially detected location.

In another aspect, in response to detecting the thermal event by the sensors 104, the controller 134 may cause foam to be applied from the reservoir 140 via the tubing 142 to the area of the thermal event as detected by the sensors 104. The foam may be applied during the second stage and/or the third stage of the thermal event.

In another aspect, in response to detecting the thermal event, the controller 134 may cause powder to be applied to the area of the thermal event. In one aspect, the powder may be applied during the third stage.

It will be appreciated that various active suppression measures may be controlled to occur at various stages. For example, the controller 134 may determine the thermal event stage that is occurring based on data from the sensors 104. The controller may also determine which type of fire suppressing material is desirable or allowable based on the environment in which the system 100 is disposed.

In the first stage, the controller 134 may perform one or more of active venting and supplying an inert gas. In the second stage, the controller 134 may perform one or more of active venting, providing liquid locally, providing liquid globally, providing foam locally, and/or providing foam globally. In the third stage, the controller 134 may cause one or more of active venting, distributing powder, providing liquid globally, providing foam. In the fourth stage, the controller 134 may cause one or more of active venting, applying a powder, and/or applying inert gas.

In addition to the passive and active fire suppression measures, the system 100 may perform additional functions in response to detecting a thermal event by the sensors 104.

For example, in response to detecting a thermal event, the system may communicate the thermal event to another party, such as first responders, the shipping company, and/or the owner or owners of the product contained within the housing unit 102. The system may communicate via the communications module 110 of the controller 134 and corresponding communications hardware, such as a radio or cellular signal, or a hard line communication network.

The system 100 may further include an alarm mechanism 170 disposed in one or more areas of the housing unit 102. The alarm mechanism 170 may be in the form of a visual or audio alarm. Thus, in response to detecting a thermal event, the alarm mechanism 170 may thereby illuminate and/or send an audio signal to alert personnel nearby of a thermal event.

In view of the above, the system 100 can effectively suppress a thermal event occurring in the housing unit 102 using both passive and active fire suppression techniques. The system can effectively manage the thermal event and communicate the existence of the thermal event to desired users, thereby enabling further manual fire suppression efforts from first responders and/or other qualified users. The system 100 may further alert personnel in the area of the thermal event to reduce risk of injury caused by the thermal event. The system 100 may be used in both a stationary storage setting and a mobile transportation setting. The automatic fire suppression techniques enable fire suppression without the need for real time inputs from users in response to detection of the thermal event.

In one aspect, the system 100 can include a training system 400 to enable users to be trained in the use of the system 100. Training for users of the system 100 and first responders who work with container systems may be desirable. The training may be comprehensive and provide a consistent educational outcome. To provide a consistent experience and include multiple exercises, the training system 400 may be used. The system may create testing scenarios that mimic actual emergency conditions, without risk to the trainee, instructor, or nearby personnel. As container standards are refined, the training system 400 may be modified. With standards established, the training system may be more specific than a general training system that may be implemented prior to specific standards being implemented. Prior to specific standards, the training system 400 may be more general. Containers may include multiple subsystems, from multiple vendors, integrated by third parties. Training may thereby be broad and promote awareness of possible issues with multi-vendor systems. Trainees may need periodic assessment and re-training. Training for previously trained individuals may be streamlined to be abbreviated to core material. Training and trainee testing may yield quantitative results to reduce the need for subjective interpretation. As risk are better understood over time, the training system 400 may have the capability to evolve and include new awareness of risks and best practices.

The training system 400 may mimic real-world conditions where possible, such as smoke, heat, gases, live electrical power, and isolation with narrow passageways. In training exercises, the instructor may have the ability to create training conditions along a present test protocol or via real-time controls. For the safety of trainees, instructors, and observers, the training may not be able to create unsafe conditions, may be aware if unsafe conditions arise, may be able to abort rapidly to a safe condition, and for gases, the gases used in training may be low enough in concentration such that they do not combust or represent a toxic hazard.

Physics based aspect may be considered, such as when convective heat rises, radiant heat disperses spherically. A sealed environment will confine gas effluent with must be vented. Lithium battery fires can self-generate flammable material for further combustion and may not be impacted by fire suppression methods. Batteries may re-ignite, even hours to days later. Accordingly, the training system 400 may take these physics based aspects into consideration.

In one aspect of a testing protocol, the following example of the container having a problem may be used. Sensors may indicate an emergency or incipient emergency. Trainees make an assessment using available information, standards of practice, and available resources. The trainees may secure the environment, for example by removing bystanders, other flammable materials, and structural impediments. The trainees may pre-position personnel and equipment before taking action. The trainees may initiate action, such as by measuring effluent gases from a vent, inserting a fiber-optic camera into a container, and/or open a container door from a safe location and use detection equipment to assess the situation. The trainer may alter the conditions, such as by adding smoke, heat, gases, electric power, simulated explosions, or the like. The trainer may initiate secondary conditions to test trainees on standard of practice knowledge, teamwork, resourcefulness, persistence, or other skills.

Figure 12:
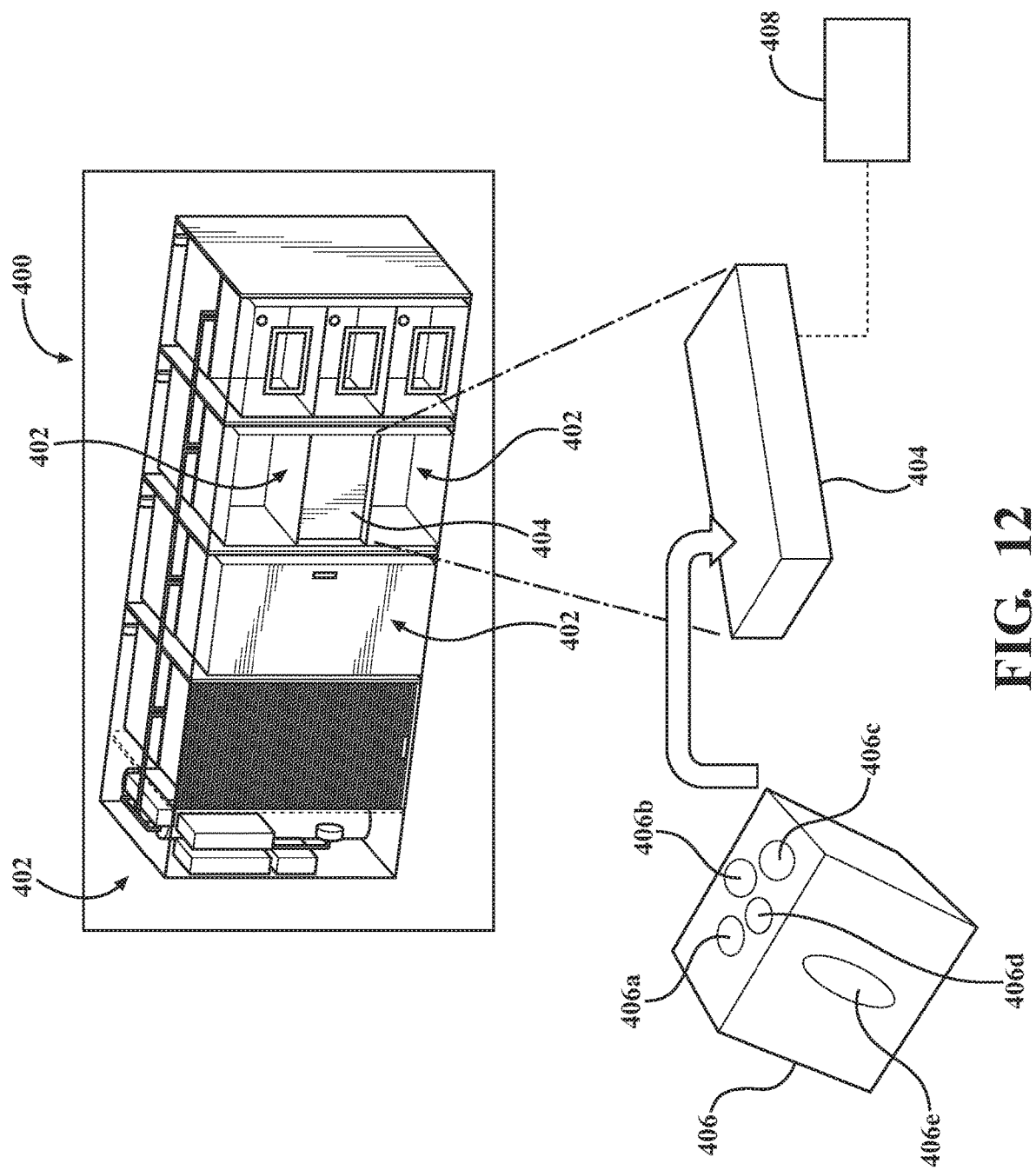
FIG. 12 illustrates one aspect of a testing system for the containment system.

With reference to FIG. 12, the training system 400 may include test sensors/observation cameras 402, and a training module 404. The modules 404 may be similar in size as a battery pack, but may configured to generate smoke, gases, heat, or sparks. The module 404 may be placed in one or more of the compartments 122. The module may include a test cell 406 that is placed therein and capable of simulating the different conditions. The training module 404 may be managed by a central controller 408, which may have a preset script of training/testing, can accept trainer instructions to alter the protocol in real time, can provide oversight of unsafe conditions, and/or can accept human data such as heartrate, breathing, and/or location of subjects. In the event of a medical or other emergency, the module 404 may be controlled to go into a failsafe mode and training room air may be evacuated immediately.

With regard to the test cell 406, the test cell may be wired to a controller and to adjacent cells. The test cell may include a heater 406a, which may be a resistive heater with built in over-temperature protection. The test cell 406 may include a thermometer 406b to measure temperature in the compartment 122. A chemical disperser 406c may emit chemical on command, and can be done via spray or heating of liquid from reservoirs within the cell, or from a central reservoir, and may also generate smoke. A chemical sensor 406d may measure the presence of a measured chemical, which may be useful to check from leakage between compartments and/or presence of a fire suppressant in a compartment.

In general, the cell 406 may be insulated to protect its electronics from high temperature and may be ruggedized for repeated use. The cell 406 may have an on board controller 406e to monitor its performance, check for depleted reservoirs, and to communicate with the controller and adjacent cells in the performance of the test protocol.

Overall, the training system 400 is designed to train/test first responders to handle thermal runaway conditions in a container. The training system may create simulated test conditions, such as smoke, heat, flame, sparks, and gases. The training system 400 may include the test modules 404 embedded in battery pack shells. For trainees, this mimics real life experience with multiple different battery pack formats. For trainers, the cells 406 are modular and can be fitted with unique characteristics to test different protocols.

The module 404 may be managed by the remote controller 408, which can execute preset training scenarios for training and testing. The controller 408 may oversee safety conditions, such as gas, flame, or the like in a training environment, and can abort if an unsafe condition is present. The controller 408 may further monitor human health, such as via EKG, respiration rate, perspiration, etc. of the trainees, and can alert the instructor and abort in the event of an emergency.

The controller 408 further executes standardized training protocols, which is useful to demonstrate knowledge and adherence to standards of practice and certifies training for an individual. The controller 408 may derive quantitative date on trainee responses, such as time to action, sequence of operations, etc. The control 408 may use an intelligence scheme with an algorithmic approach to test evolving scenarios or risk/action. The controller 408 may monitor a training exercise with auxiliary sensors for goal-based training exercises. The controller 408 may further be used for forensic analysis of events after a real-world emergency, to replay roles, actions, and events.

The above described training system 400 can be used with other systems, and is not limited to use with the system 100 described above.

The following clauses disclose embodiments of the disclosure.

Clause 1. A containment system for a hazardous product, the system comprising:
  a housing unit for storing the hazardous product;
  one or more sensors for detecting a thermal event within the housing unit;
  an active fire suppression system, configured to suppress the thermal event based on thermal event information received from the sensor;
  a passive fire suppression system configured to suppress the thermal event using passive suppression; and
  a controller in communication with the sensors and configured to detect the thermal event based on environment event information received from the sensors, the controller configured to activate the active fire suppression system.

Clause 2. The system of any preceding clause, further comprising a communication system in operative communication with the controller configured to send a notification of a detected thermal event.

Clause 3. The system of any preceding clause, wherein the housing unit includes an operations section including the controller disposed therein and at least one product section, wherein the operations section is thermally isolated from the at least one product section.

Clause 4. The system of any preceding clause, wherein the at least one product section includes a plurality of compartments.

Clause 5. The system of any preceding clause, wherein each of the plurality of compartments include a hazardous material module configured to receive a hazardous material product therein.

Clause 6. The system of any preceding clause, wherein the hazardous material module includes a frame configured to secure the hazardous material product.

Clause 7. The system of any preceding clause, wherein the passive fire suppression system includes a suppression material applied to one or more surfaces of the plurality of compartments or the at least one product section.

Clause 8. The system of any preceding clause, wherein the suppression material comprises one or more of intumescent material or phase change material.

Clause 9. The system of any preceding clause, wherein the passive fire suppression system includes temperature sensitive tubing having fluid disposed therein, where the tubing is configured to rupture in response to a temperature increase above a predetermined level.

Clause 10. The system of any preceding clause, wherein the active fire suppression system includes one or more reservoirs disposed in the operations section and tubing in fluid communication with the one or more reservoirs, wherein the one or more reservoirs include fire suppression material disposed therein, wherein the tubing extends through the housing unit into fluid communication with the plurality of compartments, wherein the fire suppression material is distributable via the tubing to the plurality of compartments in response to signals from the controller.

Clause 11. The system of any preceding clause, wherein the one or more reservoirs include one of inert gas, liquid suppressant, powder, and/or foam.

Clause 12. The system of any preceding clause, wherein the active fire suppression system operates in parallel to the passive fire suppression system.

Clause 13. The system of any preceding clause, wherein the active fire suppression system includes active vents responsive to signals from the controller.

Clause 14. The system of any preceding clause, wherein the at least one product section comprises multiple product sections divided by an expansion member, wherein the expansion member is configured to expand into adjacent open space in response to the thermal event.

Clause 15. A method for operating a containment system for a hazardous product, the method comprising:
  at a controller, detecting, via signals received from a sensor, an occurrence of a thermal event within a housing unit for storing a hazardous product;
  operating a passive fire suppression system in response to the occurrence of the thermal event;
  detecting, via the sensor, that the thermal event exceeds a predetermined threshold level; and
  in response to detecting that the thermal event exceeds a threshold level, activating an active fire suppression system and suppressing the thermal event.

Clause 16. The system of any preceding clause, wherein operating the passive fire suppression system is performed independent of detection by the sensors and without inputs or signals from the controller.

Clause 17. The system of any preceding clause, wherein the housing unit includes a plurality of compartments, wherein each of the plurality of compartments, wherein the active fire suppression system is configured to provide fire suppression to distinct ones of the plurality of compartments in response to signals from the controller based on detection of the thermal event by a corresponding sensor.

Clause 18. The system of any preceding clause, wherein the passive fire suppression system includes at least one of a temperature sensitive tube, a phase change material, or an intumescent material disposed within the housing unit.

Clause 19. The system of any preceding clause, wherein the active fire suppression system includes at least one reservoir having fire suppression material dispose therein and tubing extending from the at least one reservoir to the plurality of compartments.

Clause 20. The system of any preceding clause, wherein the controller is configured to activate the fire suppression system according to one or more predetermined control algorithms tailorable in response to user inputs.

No part of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

The foregoing description, for purposes of explanation, use specific nomenclature to provide a thorough understanding of the described embodiments. However, it should be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

The above discussion is meant to be illustrative of the principles and various embodiments of the present invention. Once the above disclosure is fully appreciated, numerous variations and modifications will become apparent to those skilled in the art. It is intended that the following claims be interpreted to embrace all such variations and modifications.

What is claimed is:

1. A containment system for hazardous products, the system comprising:
  a housing unit having compartments for storing different ones of the hazardous products therein, each of the hazardous products being a battery;
  a first fire suppression system having tubing for releasing a fire suppression material into the housing unit during a thermal event of one of the hazardous products;
  a second fire suppression system configured to suppress the thermal event; and
  a venting system configured to release the heat from the thermal event from one or more of the compartments, the venting system including one or more of a passive venting system having a valve that releases the heat or an active venting system,
  wherein the second fire suppression system comprises an intumescent material disposed on one or more surfaces of the compartments in the housing unit; and
  wherein the intumescent material is configured to begin expanding within the one compartment as a direct reaction to the heat from the thermal event before the fire suppression material begins to be released from the tubing into the one compartment, and wherein the venting system is configured to begin releasing the heat from the thermal event before the intumescent material begins to expand.

2. The system of claim 1, further comprising:
  one or more sensors for detecting the thermal event within the housing unit; and
  a controller in communication with the one or more sensors and configured to detect the thermal event based on environment event information received from the one or more sensors.

3. The system of claim 2, further comprising a communication system in operative communication with the controller configured to send a notification of a detected thermal event.

4. The system of claim 2, wherein the housing unit includes an operations section including the controller disposed therein, wherein the operations section is thermally isolated from the compartments.

5. The system of claim 4, comprising product sections that each include one or more of the compartments and are divided by an expansion member, wherein the expansion member is configured to expand into adjacent open space in response to the thermal event.

6. The system of claim 2, wherein the controller is configured to activate the first fire suppression system;
wherein the first fire suppression system includes one or more reservoirs disposed in the operations section and includes the tubing in fluid communication with the one or more reservoirs, wherein the one or more reservoirs include the fire suppression material disposed therein, wherein the tubing extends through the housing unit into fluid communication with the compartments, and wherein the fire suppression material is distributable via the tubing to the compartments in response to signals from the controller.

7. The system of claim 6, wherein the fire suppression material is at least one of inert gas, liquid suppressant, powder, and/or foam.

8. The system of claim 6, wherein the controller is configured to operate the first fire suppression system to locally release the fire suppression material to one of the compartments in which the thermal event is initially detected and, subsequently, to globally release the fire suppression material to others of the compartments.

9. The system of claim 2, wherein the venting system is the active venting system and includes active vents that are operated in response to signals from the controller.

10. The system of claim 1, wherein each of the compartments includes a hazardous material module configured to receive one of the hazardous products therein.

11. The system of claim 10, wherein the hazardous material module includes a frame configured to secure the one hazardous product therein.

12. The system of claim 1, further comprising another fire suppression material applied to one or more surfaces of the compartments, the other fire suppression material being a phase change material.

13. The system of claim 1, wherein the tubing is temperature sensitive and, thereby, configured to rupture in response to a temperature increase above a predetermined level.

14. The system of claim 1, wherein the second fire suppression system operates in parallel to the first fire suppression system.

15. The system according to claim 1, wherein the venting system is the passive venting system and includes one or more one-way pressure valves or temperature sensitive valves.

16. A method for operating a containment system for a hazardous product, the method comprising:
at a controller, detecting, via signals received from one or more sensors, an occurrence of a thermal event within a housing unit having product sections separated by at least one divider for storing the hazardous product, the hazardous product being a battery;
detecting, via the one or more sensors, the thermal event;
operating a venting system to begin releasing the heat from the thermal event from the housing unit in response to the detecting of the thermal event with the one or more sensors;
beginning to operate a passive fire suppression after beginning to operate the active venting system;
wherein the passive fire suppression system comprises an intumescent lining disposed on at least a surface portion of an interior of the product sections in the housing unit and wherein the intumescent lining is configured to expand as a direct reaction to heat from the thermal event;
detecting, via the one or more sensors, that the thermal event exceeds a predetermined threshold level; and
after the intumescent lining begins expanding and in response to detecting that the thermal event exceeds the predetermined threshold level, beginning to activate an active fire suppression system and suppressing the thermal event.

17. The method of claim 16, wherein operating the passive fire suppression system is performed independent of detection by the one or more sensors and without inputs or signals from the controller.

18. The method of claim 17, wherein the passive fire suppression system includes at least one of a temperature sensitive tube or a phase change material disposed within the housing unit.

19. The method of claim 16, wherein the housing unit includes a plurality of compartments, wherein the active fire suppression system is configured to provide fire suppression to distinct ones of the plurality of compartments in response to signals from the controller based on detection of the thermal event by a corresponding sensor.

20. The method of claim 19, wherein the active fire suppression system includes at least one reservoir having fire suppression material disposed therein and tubing extending from the at least one reservoir to the plurality of compartments.

21. The method of claim 16, wherein the controller is configured to activate the active fire suppression system according to one or more predetermined control algorithms tailorable in response to user inputs.

22. A system for storing batteries, the system comprising:
compartments for receiving and storing the batteries;
sensors for detecting a thermal event of one or more the batteries in the compartments;
a controller in communication with the sensors;
a first fire suppression system comprising a first fire suppression material lining one or more of the compartments, the first fire suppression system being configured to operate passively from exposure to heat from the thermal event of one of the batteries;
a second fire suppression system comprising a second fire suppression material, the second fire suppression system being configured to operate actively by the controller to begin causing release of the second fire suppression material to one or more of the compartments upon detection of one of the thermal event with one or more of the sensors and after the first fire suppression system begins to operate; and
a venting system being configured to be operated by the controller to begin releasing the heat from the thermal event before the first fire suppression system begins to operate;
wherein the first fire suppression material is one of an intumescent material that expands into a char from the heat or a phase change material that changes physical states caused by the heat and, thereby, absorbs the heat, and.

23. The system according to claim 22, wherein the second fire suppression material is one of an inert gas, a fluid, a powder, or a foam that that the controller causes to be released from a reservoir.

\* \* \* \* \*